United States Patent
Akiyoshi et al.

(10) Patent No.: US 9,680,328 B2
(45) Date of Patent: Jun. 13, 2017

(54) ELECTRONIC APPARATUS AND FEED SYSTEM

(71) Applicant: SONY CORPORATION, Minato-ku (JP)

(72) Inventors: Koichi Akiyoshi, Chiba (JP); Yoichi Uramoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 51 days.

(21) Appl. No.: 14/357,836

(22) PCT Filed: Dec. 11, 2012

(86) PCT No.: PCT/JP2012/082025
§ 371 (c)(1),
(2) Date: May 13, 2014

(87) PCT Pub. No.: WO2013/094469
PCT Pub. Date: Jun. 27, 2013

(65) Prior Publication Data
US 2014/0300312 A1    Oct. 9, 2014

(30) Foreign Application Priority Data

Dec. 22, 2011 (JP) .................. 2011-281212
Apr. 17, 2012 (JP) .................. 2012-093838

(51) Int. Cl.
*H02J 7/00* (2006.01)
*H02J 7/02* (2016.01)
(Continued)

(52) U.S. Cl.
CPC ............ *H02J 7/025* (2013.01); *H01M 10/44* (2013.01); *H02J 5/005* (2013.01); *H02J 17/00* (2013.01); *H02J 50/00* (2016.02); *H02J 50/10* (2016.02)

(58) Field of Classification Search
CPC .. H02J 7/025; H02J 5/005; H02J 17/00; H02J 50/00; H02J 50/10; H01M 10/44
(Continued)

(56) References Cited

U.S. PATENT DOCUMENTS

2012/0161697 A1* 6/2012 Park .................. G06F 1/263
                                                        320/108
2012/0286724 A1* 11/2012 Tsai .................. H02J 7/025
                                                        320/108
2013/0043833 A1* 2/2013 Katz .................. H02J 7/025
                                                        320/108

FOREIGN PATENT DOCUMENTS

CN    201374586 Y    12/2009
JP    2001-102974 A  4/2001
(Continued)

OTHER PUBLICATIONS

International Search Report issued Mar. 5, 2013 in PCT/JP2012/082025.
(Continued)

*Primary Examiner* — Nathaniel Pelton
(74) *Attorney, Agent, or Firm* — Oblon, McClelland, Maier & Neustadt, L.L.P.

(57) ABSTRACT

An electronic apparatus includes: a power reception section configured to receive first power from a feed unit through power transmission with use of a magnetic field or an electric field; a power input section configured to receive second power supplied from an external power source through wired connection; a switching section configured to output one of the first power supplied from the power reception section and the second power supplied from the power input section; and a secondary battery configured to be charged, based on power output from the switching section.

18 Claims, 11 Drawing Sheets

(51) Int. Cl.
*H02J 50/00* (2016.01)
*H02J 50/10* (2016.01)
*H01M 10/44* (2006.01)
*H02J 5/00* (2016.01)
*H02J 17/00* (2006.01)

(58) Field of Classification Search
USPC .............................................. 320/107, 108
See application file for complete search history.

(56) References Cited

FOREIGN PATENT DOCUMENTS

| | | |
|---|---|---|
| JP | 2002-34169 A | 1/2002 |
| JP | 2003-134699 | 5/2003 |
| JP | 2003-134699 A | 5/2003 |
| JP | 2003-153456 A | 5/2003 |
| JP | 2005-110399 A | 4/2005 |
| JP | 2007-336710 | * 12/2007 |
| JP | 2007-336710 A | 12/2007 |
| JP | 2008-206233 A | 9/2008 |
| JP | 2010-63245 A | 3/2010 |
| WO | WO 00/27531 A1 | 5/2000 |
| WO | WO 2010/131349 A1 | 11/2010 |

OTHER PUBLICATIONS

Combined Chinese Office Action and Search Report issued Oct. 27, 2015 in Patent Application No. 2012800061987.7 (with English Translation).

Office Action issued on Apr. 5, 2016 in Japanese Patent Application No. 2012-093838.

Office Action dated Jun. 13, 2016 for Chinese Application No. 201280061987.7 and English translation thereof.

* cited by examiner

ELECTRONIC APPARATUS AND FEED SYSTEM

TECHNICAL FIELD

The present disclosure relates to a feed system performing non-contact power supply (power transmission) on a unit to be fed with power such as an electronic apparatus, and to an electronic apparatus applied to such a feed system.

BACKGROUND ART

In recent years, a feed system (a non-contact feed system, or a wireless charging system) performing non-contact power supply (power transmission) on consumer electronics devices (CE devices) such as mobile phones and portable music players has attracted attention. Accordingly, charging is allowed to be started by not inserting (connecting) a connector of a power supply such as an AC adapter into a unit but placing an electronic apparatus (a secondary-side unit) on a charging tray (a primary-side unit). In other words, terminal connection between the electronic apparatus and the charging tray is unnecessary.

As a method of performing non-contact power supply in such a way, an electromagnetic induction method is well known. In addition, a non-contact feed system using a method called magnetic resonance method that uses electromagnetic resonance phenomenon has attracted attention. Such a non-contact feed system has been disclosed in, for example, PTLs 1 to 6.

CITATION LIST

Patent Literature

PTL 1: Japanese Unexamined Patent Application Publication No. 2001-102974
PTL 2: International Publication No. WO00-27531
PTL 3: Japanese Unexamined Patent Application Publication No. 2008-206233
PTL 4: Japanese Unexamined Patent Application Publication No. 2002-34169
PTL 5: Japanese Unexamined Patent Application Publication No. 2005-110399
PTL 6: Japanese Unexamined Patent Application Publication No. 2010-63245

SUMMARY OF INVENTION

Incidentally, in the non-contact feed system as described above, improvement in usability of a user by, for example, improving a method of charging is desired.

Therefore, it is desirable to provide a feed system and an electronic apparatus that are capable of improving usability of a user at the time of performing feeding operation.

An electronic apparatus according to an embodiment of the disclosure includes: a power reception section configured to receive first power from a feed unit through power transmission with use of a magnetic field or an electric field; a power input section configured to receive second power supplied from an external power source through wired connection; a switching section configured to output one of the first power supplied from the power reception section and the second power supplied from the power input section; and a secondary battery configured to be charged, based on power output from the switching section.

A feed system according to an embodiment of the disclosure includes one or a plurality of the electronic apparatuses (units to be fed with power) according to the above-described embodiment of the disclosure and a feed unit that performs power transmission on the electronic apparatuses with use of a magnetic field or an electric field.

In the electronic apparatus and the feed system according to the respective embodiments of the disclosure, one of the first power from the feed unit through the power transmission using the magnetic field or the electric field and the second power from the external power source through the wired connection is output from the switching section, and the charging to the secondary battery is performed based on the output power. Specifically, the charging operation with high degree of freedom that selectively uses one of the power (the first power) through the power transmission using the magnetic field or the electric field and the power (the second power) supplied through the wired connection is achieved.

According to the electronic apparatus and the feed system according to the respective embodiments of the disclosure, one of the first power from the feed unit through the power transmission using the magnetic field or the electric field and the second power from the external power source through the wired connection is output from the switching section, and the charging to the secondary battery is performed based on the output power. Therefore, it is possible to achieve the charging operation with high degree of freedom. Consequently, it is possible to improve usability of a user in performing the feeding operation.

DESCRIPTION OF EMBODIMENTS

An embodiment of the present disclosure will be described in detail below with reference to drawings. Note that description will be given in the following order.
1. Embodiment (an example of an input switching circuit that preferentially inputs power supplied through wired connection)
2. Modifications
   Modification 1 (an example of an input switching circuit that preferentially inputs power transmitted using a magnetic field)
   Modification 2 (an example of dynamically controlling operation of an input switching circuit by a control section)
3. Other Modifications (an example of a feed system that performs non-contact power transmission using an electronic field, etc.)

<Embodiment>
(General Configuration of Feed System 4)

Figure 1:
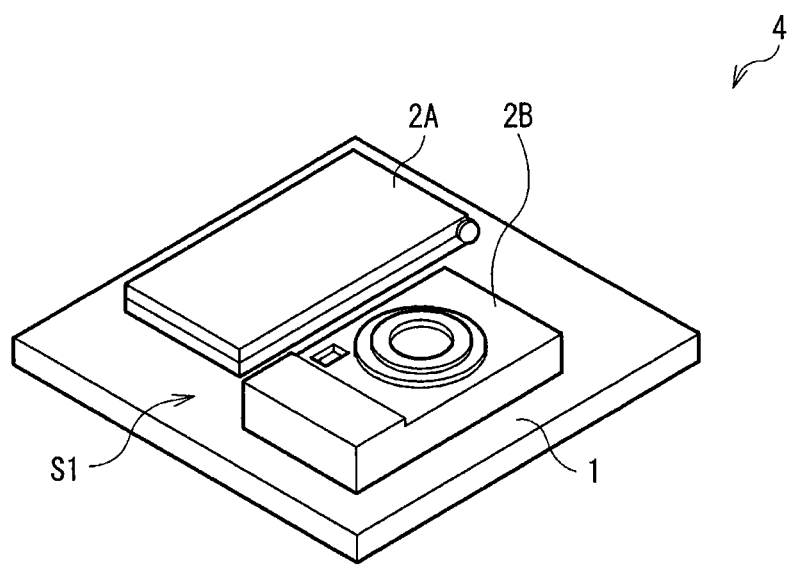
FIG. 1 is a perspective view illustrating an appearance configuration example of a feed system according to an embodiment of the present disclosure.
Figure 2:
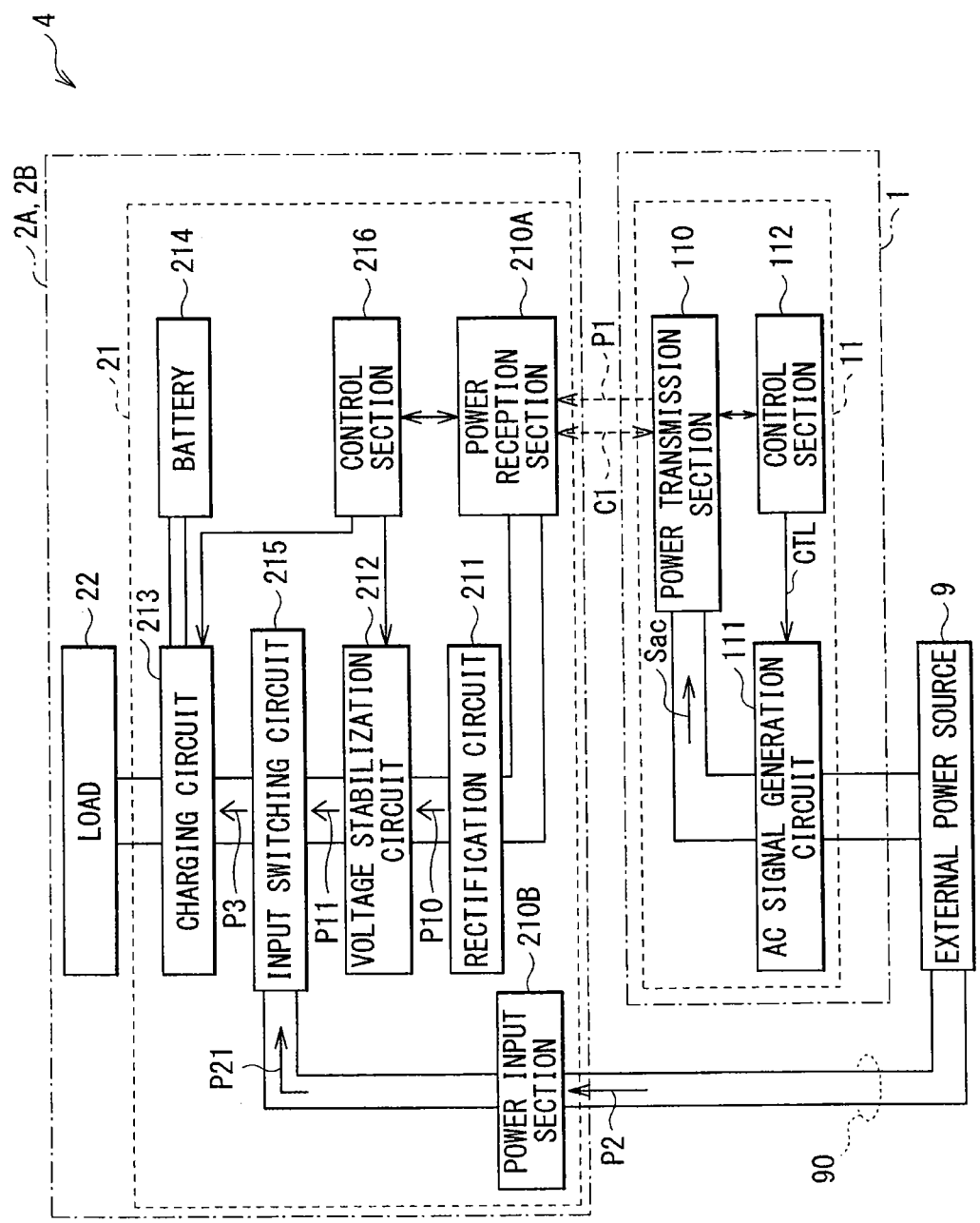
FIG. 2 is a block diagram illustrating a detailed configuration example of the feed system illustrated in FIG. 1.

FIG. 1 illustrates an appearance configuration example of a feed system (a feed system 4) according to an embodiment of the present disclosure, and FIG. 2 illustrates a block configuration example of the feed system 4. The feed system 4 is a system (a non-contact feed system) capable of performing non-contact power transmission (power supply, power feeding) with use of a magnetic field (with use of magnetic resonance, electromagnetic induction, and the like, hereinafter the same). Moreover, the feed system 4 is also capable of performing power supply through wired connection using a cord in wired system (a power supply cord 90) described later. The feed system 4 includes a feed unit 1 (a primary-side unit), and one or a plurality of electronic apparatuses (in this case, two electronic apparatuses 2A and 2B, secondary-side units) as units to be fed with power.

As illustrated in FIG. 1, for example, in the feed system 4, the electronic apparatuses 2A and 2B are placed (or closely disposed) on a feeding surface (a power transmission surface) S1 of the feed unit 1 so that the power transmission is performed from the feed unit 1 to the electronic apparatuses 2A and 2B. In other words, for example, as illustrated in FIG. 2, power (transmitted power) P1 (first power) by the above-described power transmission using a magnetic field is allowed to be supplied from the feed unit 1 to the electronic apparatuses 2A and 2B. In this case, in consideration of the case where the power transmission is performed to the plurality of electronic apparatuses 2A and 2B at the same time or in a time-divisional manner (sequentially), the feed unit 1 has a mat shape (a tray shape) in which an area of the feeding surface S1 is larger than the size of the electronic apparatuses 2A and 2B, etc., to be fed with power.

For example, as illustrated in FIG. 2, in the feed system 4, power P2 (second power) by wired connection using the above-described power supply cord 90 is allowed to be supplied from an external power source 9 (a master power source) to the electronic apparatuses 2A and 2B. Note that, as the external power source 9, for example, a power source (power supply capacity: 500 mA, source voltage: about 5 V) of universal serial bus (USB) 2.0 that is provided in personal computer (PC) or the like may be used.

(Feed Unit 1)

As described above, the feed unit 1 is a unit (a charging tray) transmitting power (performing power transmission) to the electronic apparatuses 2A and 2B with use of a magnetic field. As illustrated in FIG. 2, for example, the feed unit 1 may include a power transmission device 11 including a power transmission section 110, an AC signal generation circuit (a high-frequency power generation circuit) 111, and a control section 112.

The power transmission section 110 is configured to include a power transmission coil (a primary-side coil) L1, capacitors $C1p$ and $C1s$ (resonance capacitors), and the like, which will be described later. The power transmission section 110 uses the power transmission coil L1 and the capacitors $C1p$ and $C1s$ to transmit power (perform power transmission) to the electronic apparatuses 2A and 2B (in detail, a power reception section 210A described later) with use of an AC magnetic field (see power P1 illustrated by an arrow in FIG. 2). More specifically, the power transmission section 110 has a function of radiating a magnetic field (a magnetic flux) from the feeding surface S1 toward the electronic apparatuses 2A and 2B. The power transmission section 110 further has a function of performing predetermined mutual communication operation with the power reception section 210A described later (see an arrow C1 in FIG. 2).

The AC signal generation circuit 111 is a circuit that uses power supplied from the above-described external power source 9 to generate a predetermined AC signal Sac (high-frequency power) for power transmission. Such an AC signal generation circuit 111 may be configured using, for example, a switching amplifier described later.

The control section 112 performs various control operation in the entire feed unit 1 (the entire feed system 4). Specifically, the control section 112 may have, for example, a function of performing appropriate control of the transmitted power, a function of authenticating a secondary-side unit, a function of determining whether a secondary-side unit is placed on a primary-side unit, a function of detecting mixture of a dissimilar metal and the like, etc., in addition to the function of controlling the power transmission (power transmission operation) and the communication (communication operation) by the power transmission section 110. In this case, in the above-described power transmission control, the control section 112 uses a predetermined control signal CTL (a control signal for power transmission) described later, to control the operation of the AC signal generation circuit 111. Moreover, the control section 112 has a function of performing modulation processing by pulse width modulation (PWM) described later with use of the control signal CTL.

(Electronic Apparatuses 2A and 2B)

For example, the electronic apparatuses 2A and 2B are each configured of a stationary electronic apparatus typified by a television receiver, a portable electronic apparatus including a rechargeable battery (a battery), typified by a mobile phone and a digital camera, or the like. For example, as illustrated in FIG. 2, these electronic apparatuses 2A and 2B each may include a power reception device 21, and a load 22 that performs predetermined operation (operation exerting functions as an electronic apparatus) based on power supplied from the power reception device 21. In addition, the power reception device 21 includes the power reception section 210A, a power input section 210B, a rectification circuit 211, a voltage stabilization circuit 212 (a power source circuit), a charging circuit 213 (a charging section), a battery 214 (a secondary battery), an input switching circuit 215 (a switching section), and a control section 216.

The power reception section 210A is configured to include a power reception coil (a secondary-side coil) L2, capacitors $C2p$ and $C2s$ (resonance capacitors), and the like, that will be described later. The power reception section 210A has a function of receiving the power P1 transmitted from the power transmission section 110 in the feed unit 1 with use of the power reception coil L2, the capacitors C2$p$ and C2$s$, and the like. The power reception section 210A also has a function of performing the above-described predetermined mutual communication operation with the power transmission section 110 (see the arrow C1 in FIG. 2).

The power input section 210B is a section (a power input terminal) that receives the power P2 supplied by the wired connection from the above-described external power source 9 through the power supply cord 9. For example, when the external power source 9 is the above-described power source of USB, the power input section 210B is configured of a USB connector, or the like.

The rectification circuit 211 is a circuit that rectifies the power (AC power) supplied from the power reception section 210A to generate DC power (power P10).

The voltage stabilization circuit 212 is a circuit that performs predetermined voltage stabilization operation, based on the DC power (the power P10) supplied from the rectification circuit 211, to generate DC power (power P11) after the voltage stabilization. In this case, the voltage stabilization circuit 212 is provided on a path between the power reception section 210A and the input switching circuit 215 (specifically, between the rectification circuit 211 and the input switching circuit 215).

The input switching circuit 215 is a circuit outputting one of the power P1 (the power P1 by the power transmission using a magnetic field) supplied from the power reception section 210A and the power P2 (the power P2 supplied through the wired connection) supplied from the power input section 210B. In detail, the input switching circuit 215 is a circuit that selects one of the power P11 (the power P10) obtained based on the power P1 and power P21 supplied from the power input section 210B based on the power P2, and outputs the selected one as power P3 to the charging circuit 213. More specifically, the input switching circuit 215 outputs, as the power P3, the power P11 based on the power P1 when only the power P1 is supplied to the electronic apparatuses 2A and 2B, and outputs, as the power P3, the power P21 based on the power P2 when only the power P2 is supplied to the electronic apparatuses 2A and 2B. In addition, when both the power P1 and P2 are supplied to the electronic apparatuses 2A and 2B, the input switching circuit 215 selects and outputs one of the power P1 and P2.

Figure 3:
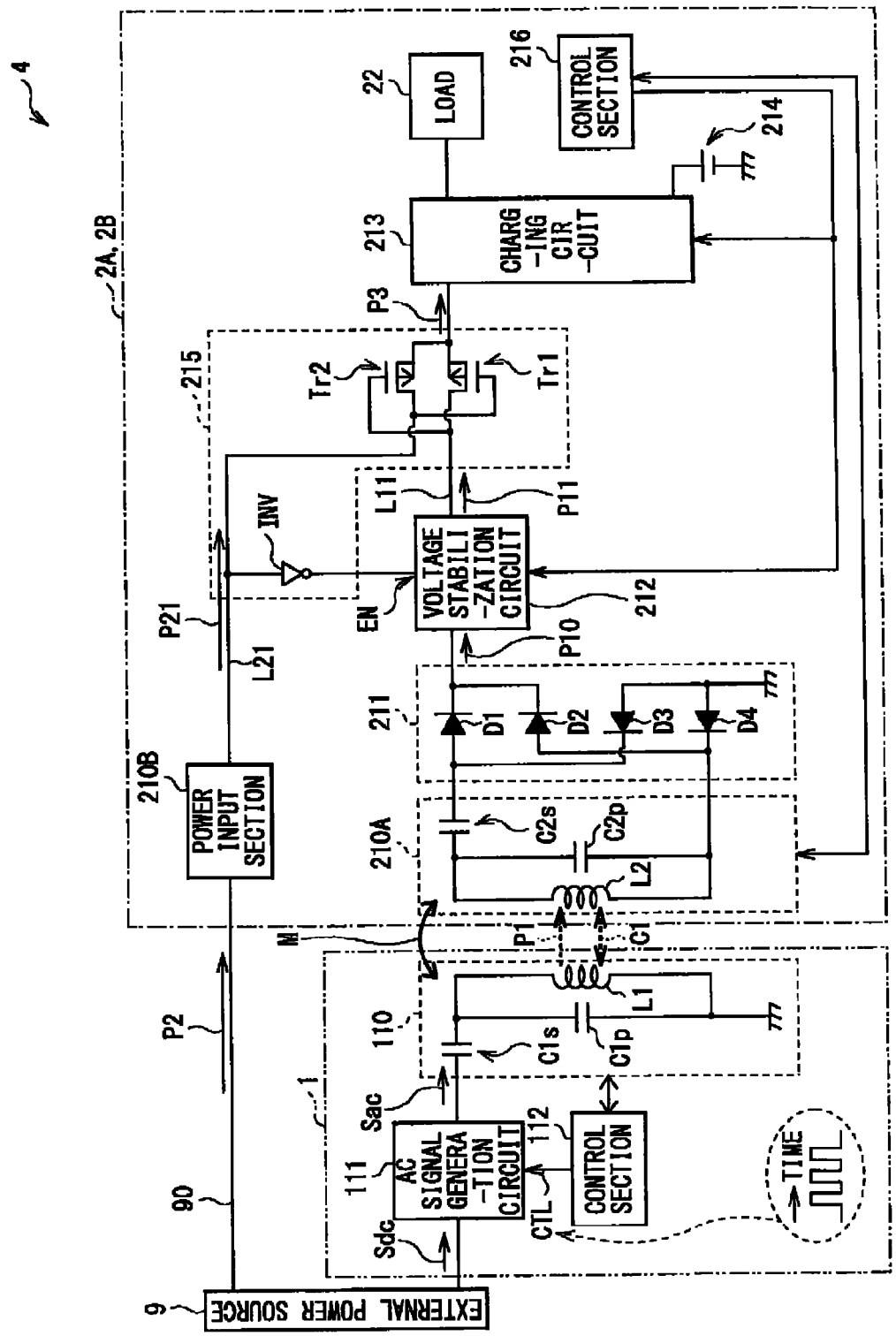
FIG. 3 is a circuit diagram illustrating a detailed configuration example of each block illustrated in FIG. 2.

In particular, although the detail will be described later, the input switching circuit 215 of the present embodiment preferentially selects and outputs the power P2 by the wired connection when both the power P1 and P2 are supplied to the electronic apparatuses 2A and 2B. In addition, the input switching circuit 215 has a function of rendering the operation of the voltage stabilization circuit 212 invalid when at least the power P2 is supplied (when only the power P2 is supplied, and when both the power P1 and P2 are supplied), as will be described later. Note that the detailed configuration of the input switching circuit 215 will be described later (FIG. 3).

The charging circuit 213 is a circuit that performs charging to the battery 214, based on the above-described power P3 output from the input switching circuit 215. The charging circuit 213 is provided between the input switching circuit 215 and the load 22 in this case.

The battery 214 stores therein power in response to the charging by the charging circuit 213, and may be configured using a rechargeable battery (a secondary battery) such as a lithium ion battery.

The control section 216 performs various control operation in the entire electronic apparatuses 2A and 2B (the entire feed system 4). Specifically, for example, the control section 216 may have a function of performing control of power reception and communication by the power reception section 110, and a function of controlling operation of the voltage stabilization circuit 212, the charging circuit 213, and the like.

(Detailed Configurations of Feed Unit 1 and Electronic Apparatuses 2A and 2B)

FIG. 3 is a circuit diagram illustrating a detailed configuration example of each block in the feed unit 1 and the electronic apparatuses 2A and 2B illustrated in FIG. 2.

(Power Transmission Section 110)

The power transmission section 110 includes the power transmission coil L1 to perform power transmission using a magnetic field (to generate a magnetic flux), and the capacitors C1$p$ and C1$s$ to form, together with the power transmission coil L1, an LC resonance circuit. The capacitor C1$s$ is electrically connected in series to the power transmission coil L1. In other words, an end of the capacitor C1$s$ and an end of the power transmission coil L1 are connected to each other. Moreover, the other end of the capacitor C1$s$ and the other end of the power transmission coil L1 are connected in parallel to the capacitor C1$p$, and the connection end of the power transmission coil L1 and the capacitor C1$p$ is grounded.

The LC resonance circuit configured of the power transmission coil L1 and the capacitors C1$p$ and C1$s$, and an LC resonance circuit described later configured of the power reception coil L2 and the capacitors C2$p$ and C2$s$ are magnetically coupled with each other. As a result, LC resonance operation by a resonance frequency that is substantially the same as that of the high-frequency power (the AC signal Sac) described later generated by the AC signal generation circuit 111, is performed.

(AC Signal Generation Circuit 111)

Figure 4:
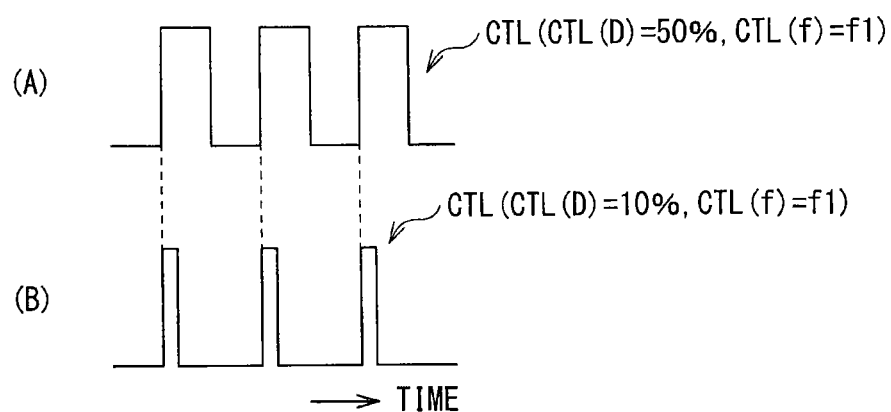
FIG. 4 is a timing waveform chart illustrating an example of a control signal to an AC signal generation circuit.

The AC signal generation circuit 111 is configured using a switching amplifier (a so-called class-E amplifier) that has one transistor (not illustrated) as a switching device. The control signal CTL for the power transmission is supplied from the control section 112 to the AC signal generation circuit 111. The control signal CTL is formed of a pulse signal having a predetermined duty ratio as illustrated in FIG. 3. Moreover, for example, as illustrated in (A) and (B) of FIG. 4, the duty ratio of the control signal CTL is controlled to perform pulse width modulation described later.

With such a configuration, in the AC signal generation circuit 111, the above-described transistor performs ON-OFF operation (switching operation by a predetermined frequency and the duty ratio), according to the control signal CTL for the power transmission. Specifically, the ON-OFF operation of the transistor as the switching device is controlled with use of the control signal CTL supplied from the control section 112. Accordingly, the AC signal Sac (AC power) is generated based on a DC signal Sdc that is input from, for example, the external power source 9 side, and the AC signal Sac is supplied to the power transmission section 110.

(Power Reception Section 210A)

The power reception section 210A includes a power reception coil L2 to receive the power P1 (from the magnetic flux) transmitted from the power transmission section 110 and the capacitors C2$p$ and C2$s$ to form, together with the power reception coil L2, an LC resonance circuit. The capacitor C2$p$ is electrically connected in parallel to the power reception coil L2, and the capacitor C2s is electrically connected in series to the power reception coil L2. In other words, an end of the capacitor C2s is connected to an end of the capacitor C2p and an end of the power reception coil L2. In addition, the other end of the capacitor C2s is connected to one of input terminals of the rectification circuit 211, and the other end of the power reception coil L2 and the other end of the capacitor C2p are connected to the other input terminal of the rectification circuit 211.

The LC resonance circuit configured of the power reception coil L2 and the capacitors C2p and Cs2 and the above-described LC resonance circuit configured of the power transmission coil L1 and the capacitors C1p and C1s are magnetically coupled with each other. As a result, LC resonance operation by a resonance frequency that is substantially the same as that of the high-frequency power (the AC signal Sac) generated by the AC signal generation circuit 111, is performed.

(Rectification Circuit 211)

The rectification circuit 211 is configured using four rectification elements (diodes) D1 to D4 in this case. Specifically, an anode of the rectification element D1 and a cathode of the rectification element D3 are connected to one of the input terminals of the rectification circuit 211, a cathode of the rectification element D1 and a cathode of the rectification element D2 are connected to an output terminal of the rectification circuit 211. In addition, an anode of the rectification element D2 and a cathode of the rectification element D4 are connected to the other input terminal of the rectification circuit 211, and an anode of the rectification element D3 and an anode of the rectification element D4 are grounded. With this configuration, the rectification circuit 211 rectifies the AC power supplied from the power reception section 210A, and supplies received power formed of DC power, to the voltage stabilization circuit 212.

(Input Switching Circuit 215)

The input switching circuit 215 is configured using two transistors Tr1 and Tr2 as switching devices and one inverter circuit (a logical NOT circuit) INV. For example, each of the transistors Tr1 and Tr2 may be configured of P-type metal oxide semiconductor field effect transistor (MOSFET).

The transistor Tr1 is disposed on a connection line (a connection path) L11 between the voltage stabilization circuit 212 and the charging circuit 213, and the transistor Tr2 is disposed on a connection line L21 between the power input section 210B and the charging circuit 213. Specifically, a gate of the transistor Tr1 is connected to a source of the transistor Tr2, a source of the transistor Tr1 is connected to an output germinal of the voltage stabilization circuit 212, and a drain of the transistor Tr1 is connected to an input terminal of the charging circuit 213. Moreover, a gate of the transistor Tr2 is connected to the source of the transistor Tr1, the source of the transistor Tr2 is connected to an output terminal of the power input section 210B, and a drain of the transistor Tr2 is connected to the input terminal of the charging circuit 213.

An input terminal of the inverter circuit INV is connected between the output terminal of the power input section 210B and the source of the transistor Tr2 on the connection line L21, and an output terminal thereof is connected to an enable terminal EN of the voltage stabilization circuit 212. The enable terminal EN is a terminal to control (switch) valid and invalid of the operation (the voltage stabilization operation) in the voltage stabilization circuit 212. Specifically, when a logical signal of "H (high)" is input to the enable terminal EN, the operation of the voltage stabilization circuit 212 becomes valid, and the power P11 is generated based on the input power P10 to be output. On the other hand, when a logical signal of "L (low)" is input to the enable terminal EN, the operation of the voltage stabilization circuit 212 becomes invalid (stops), and the power P11 is not generated even when the power P10 is input. Since the operation of the voltage stabilization circuit 212 is controlled based on such a logic, the logical signal is inverted by the above-described inverter circuit INV in this case.

(Function and Effects of Feed System 4)

Subsequently, function and effects of the feed system 4 according to the present embodiment is described.

(1. Outline of General Operation)

In the feed system 4, the AC signal generation circuit 111 in the feed unit 1 supplies predetermined high-frequency power (the AC signal Sac) for power transmission, to the power transmission coil L1 and the capacitors C1p and C1s (the LC resonance circuit) in the power transmission section 110, based on the power supplied from the external power source 9. Accordingly, a magnetic field (a magnetic flux) is generated in the power transmission coil L1 in the power transmission section 110. At this time, when the electronic apparatuses 2A and 2B that are units to be fed with power (to be charged) are placed (or closely disposed) on a top surface (the feeding surface S1) of the feed unit 1, the power transmission coil L1 in the feed unit 1 and the power reception coil L2 in each of the electronic apparatuses 2A and 2B are brought close to each other near the feeding surface S1.

In this way, when the power reception coil L2 is disposed near the power transmission coil L1 generating the magnetic field (the magnetic flux), electromotive force is generated in the power reception coil L2 by induction of the magnetic flux generated from the power transmission coil L1. In other words, interlinkage magnetic field is generated in each of the power transmission coil L1 and the power reception coil L2 by electromagnetic induction or magnetic resonance. As a result, power is transmitted from the power transmission coil L1 side (a primary side, the feed unit 1 side, the power transmission section 110 side) to the power reception coil L2 side (a secondary side, the electronic apparatuses 2A and 2B side, the power reception section 210A side) (see the power P1 illustrated by the arrow in FIG. 2 and FIG. 3). At this time, the power transmission coil L1 on the feed unit 1 side and the power reception coil L2 on the electronic apparatuses 2A and 2B side are magnetically coupled with each other by the electromagnetic induction or the like, and thus the LC resonance operation is performed in the above-described LC resonance circuit.

Then, in the electronic apparatuses 2A and 2B, the AC power (the power P1) received by the power reception coil L2 is supplied to the rectification circuit 211 and the voltage stabilization circuit 212. Further, when the power P3 based on the power P1 is supplied to the charging circuit 213 through the input switching circuit 215 described later, the following charging operation is performed. Specifically, after the power P1 is converted into predetermined DC power by the rectification circuit 211 and is subjected to the voltage stabilization by the voltage stabilization circuit 212, charging to the battery 214 based on the above-described power P3 is performed by the charging circuit 213. In this way, in the electronic apparatuses 2A and 2B, the charging operation based on the power P1 received by the power reception section 210A is performed.

In other words, in the feed system 4 according to the present embodiment, in the charging of the electronic apparatuses 2A and 2B, charging is easily started (non-contact feeding is performed) only by placing (closely disposing)

the electronic apparatuses 2A and 2B on the feeding surface S1 of the feed unit 1. This leads to liability relief of a user.

(Feeding Operation by Wired Connection)

In the feed system 4, the feeding operation by the wired connection from the external power source 90 is also allowed to be performed using a cord in wired system (the power supply cord 90), in addition to the above-described non-contact feeding operation using a magnetic field. Specifically, there are two feeding modes, namely, a mode in which the power P1 is supplied to the electronic apparatuses 2A and 2B from the feed unit 1 with use of the magnetic field (a non-contact feeding mode) and a mode in which the power P2 is supplied to the electronic apparatuses 2A and 2B from the external power source 9 through the wired connection (a wired feeding mode).

In such feeding operation by the wired connection (in the wired feeding mode), as illustrated in FIG. 3, the power P2 is supplied from the external power source 9 to the power input section 210B through the power supply cord 90, and the power P21 based on the power P2 is supplied from the power supply section 210B to the input switching circuit 215. Then, in this case, the power P21 is output as the power P3 from the input switching circuit 215, and the charging operation to the battery 214 is performed by the charging circuit 213 based on the power P3.

Note that the feed system having a plurality of power supply interfaces (I/Fs) (provided with a plurality of power input paths) is a configuration sufficiently assumed in a transition period (an introduction period, an early period) from a feed system by only wired connection to a feed system by a non-contact connection using a magnetic field.

(Non-Contact Communication Operation Using Magnetic Field)

Figure 5:
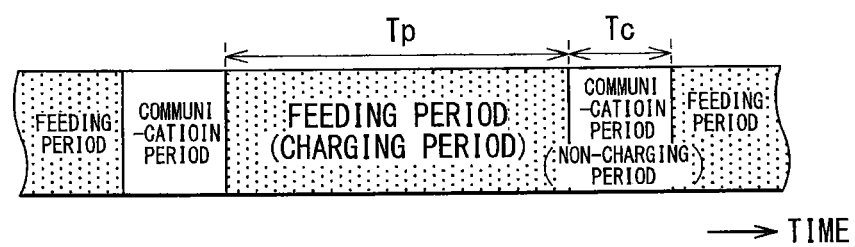
FIG. 5 is a timing chart illustrating an example of a feeding period and a communication period.

In addition, for example, as illustrated in FIG. 5, in the feed system 4, in the above-described non-contact feeding operation using a magnetic field, a feeding period Tp (a charging period to the battery 214) and a communication period Tc (a non-charging period) are periodically (or non-periodically) performed in a time-divisional manner. In other words, the control section 112 and the control section 216 perform control so that the feeding period Tp and the communication period Tc are periodically (or non-periodically) set in a time-divisional manner. In this case, the communication period Tc is a period during which mutual communication operation (communication operation for mutual authentication between units, feed efficiency control, or the like) is performed between the primary-side unit (the feed unit 1) and the secondary-side unit (the electronic apparatuses 2A and 2B) with use of the power transmission coil L1 and the power reception coil L2 (see the arrow C1 in FIG. 2 and FIG. 3). Incidentally, the time ratio of the feeding period Tp and the communication period Tc at this time may be, for example, the feeding period Tp: the communication period Tc=about 9:1.

At this time, during the communication period Tc, for example, the communication operation using pulse width modulation may be performed by the AC signal generation circuit 111. Specifically, the duty ratio of the control signal CTL during the communication period Tc is set based on predetermined modulation data, and thus the communication by the pulse width modulation is performed. Note that, since it is difficult in principle to perform frequency modulation at the time of resonance operation by the power transmission section 110 and the power reception section 210 described above, such pulse width modulation is used to achieve the communication operation easily.

(2. Power Input Switching Operation)

Moreover, in the feed system 4 according to the present embodiment, the power input switching operation (power selective output operation) is performed by the input switching circuit 215 in each of the electronic apparatuses 2A and 2B in the following manner. Note that, for convenience of description, the transistors Tr1 and Tr2 are each illustrated by a shape of a changing-over switch in the following description.

(When Only Power P1 Using Magnetic Field is Supplied)

Figure 6:
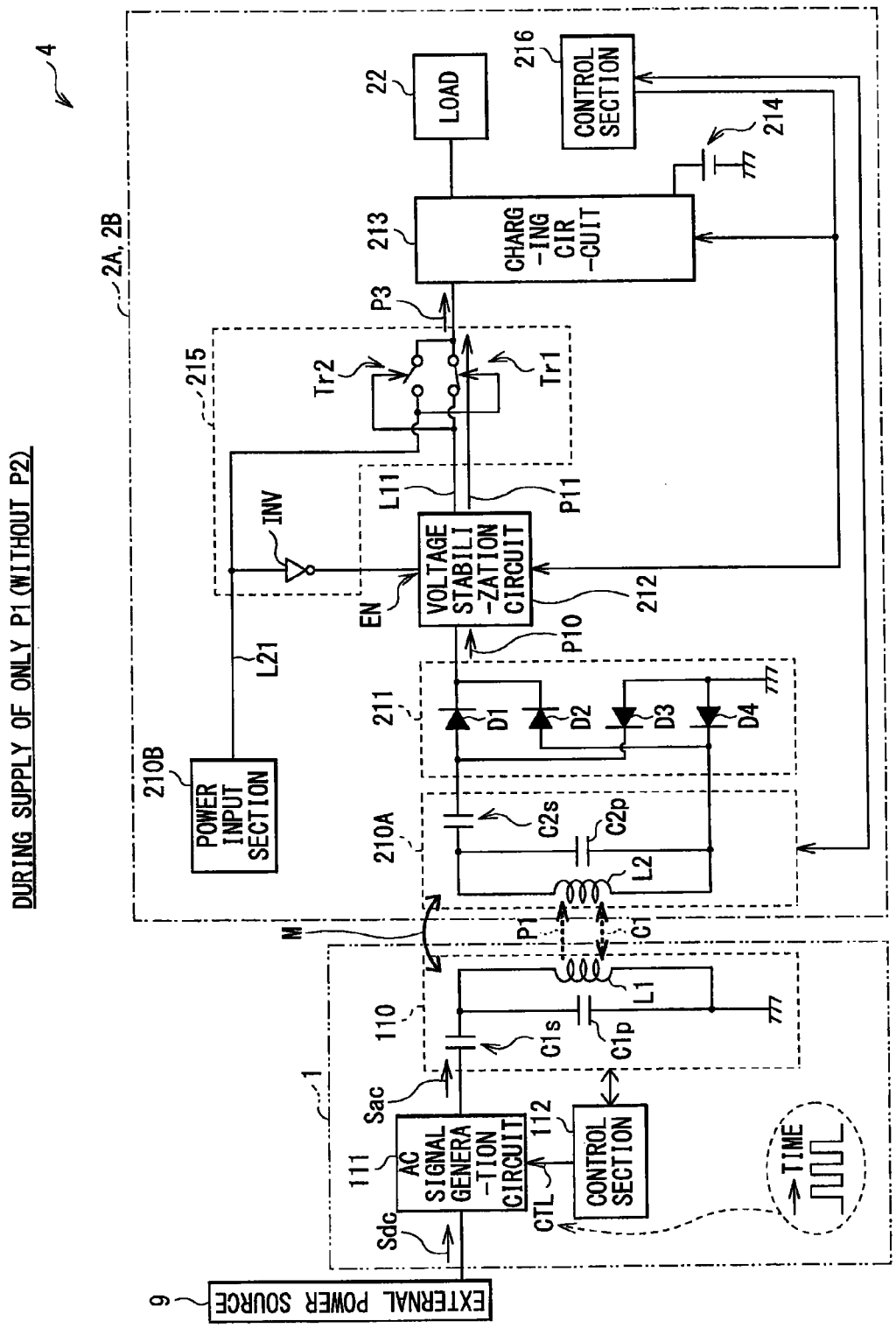
FIG. 6 is a circuit diagram illustrating an example of input switching operation in the feed system illustrated in FIG. 3.

First, for example, as illustrated in FIG. 6, when only the power P1 is supplied from the feed unit 1 to the electronic apparatuses 2A and 2B with use of the magnetic field and the power P2 by the wired connection is not supplied, the input switching operation by the input switching circuit 215 is performed in the following manner.

Specifically, in this case, since the power P21 is not output from the power input section 210B, an input signal to the inverter circuit INV is an "L" signal, and an output signal therefrom is a "H" signal. Therefore, the "H" signal is input to the enable terminal EN of the voltage stabilization circuit 212 in this case and the operation of the voltage stabilization circuit 212 becomes valid. Therefore, the power P11 is generated based on the input power P10 and is output to the input switching circuit 215.

In addition, as described above, since a signal on the connection line L21 from the power input section 210B is the "L" signal in this case, the P-type transistor Tr1, the gate of which is supplied with the "L" signal is put into the ON state. On the other hand, since a signal on the connection line L11 to which the power P11 is output, from the voltage stabilization circuit 212 is the "H" signal, the P-type transistor Tr2, the gate of which is supplied with the "H" signal is put into the OFF state.

When only the power P1 using the magnetic field is supplied in this way, in the input switching circuit 215, the transistor Tr1 is put into the ON state as well as the transistor Tr2 is put into the OFF state. Therefore, the power P11 based on the power P1 is selectively output as the power P3. Accordingly, in this case, the charging operation to the battery 214 is performed based on the power P1 using the magnetic field.

(When Only Power P2 by Wired Connection is Supplied)

Figure 7:
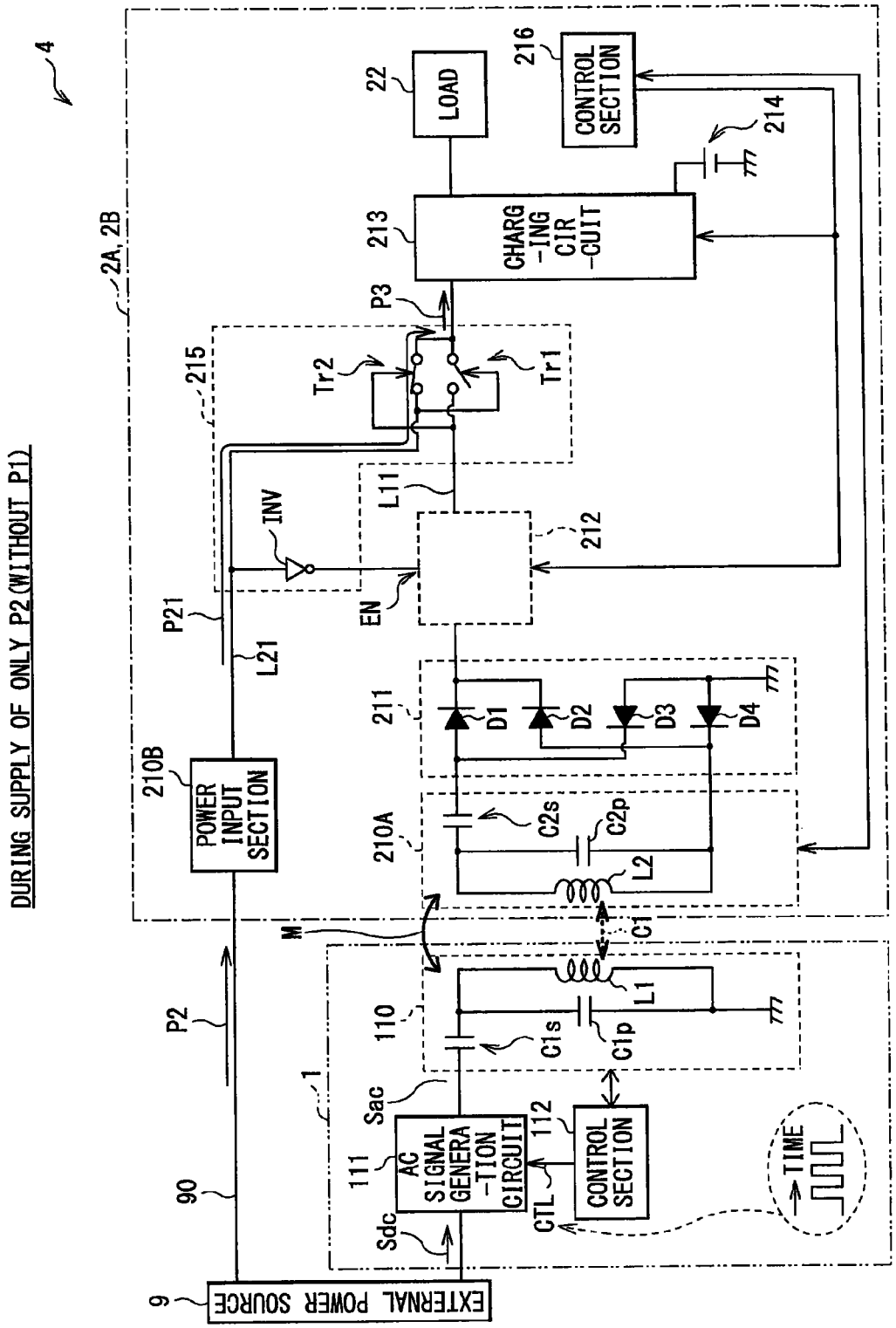
FIG. 7 is a circuit diagram illustrating another example of the input switching operation in the feed system illustrated in FIG. 3.

On the other hand, for example, as illustrated in FIG. 7, when only the power P2 is supplied from the feed unit 1 to the electronic apparatuses 2A and 2B through the wired connection and the power P1 using the magnetic field is not supplied, the input switching operation by the input switching circuit 215 is performed in the following manner.

More specifically, in this case, since the power P21 is output from the power input section 210B, the input signal to the inverter circuit INV is the "H" signal, and the output signal therefrom is the "L" signal. Therefore, the "L" signal is input to the enable terminal EN of the voltage stabilization circuit 212 in this case, and the operation of the voltage stabilization circuit 212 becomes invalid (is stopped). Therefore, the power P11 is not generated and is not output to the input switching circuit 215.

Moreover, as described above, since the signal on the connection line L21 from the power input section 210B is the "H" signal in this case, the P-type transistor Tr1, the gate of which is supplied with the "H" signal is put into the OFF state. On the other hand, since the signal on the connection line L11 to which the power P11 is not output, from the voltage stabilization circuit 212 is the "L" signal, the P-type transistor Tr2, the gate of which is supplied with the "L" signal is put into the ON state.

In this way, when only the power P2 by the wired connection is supplied, the transistor Tr1 is put into the OFF state and the transistor Tr2 is put into the ON state in the input switching circuit 215. Therefore the power P21 based on the power P2 is selectively output as the power P3. Accordingly, in this case, the charging operation to the battery 214 is performed based on the power P2 by the wired connection.

(When Both Power P1 and P2 are Supplied)

Figure 8:
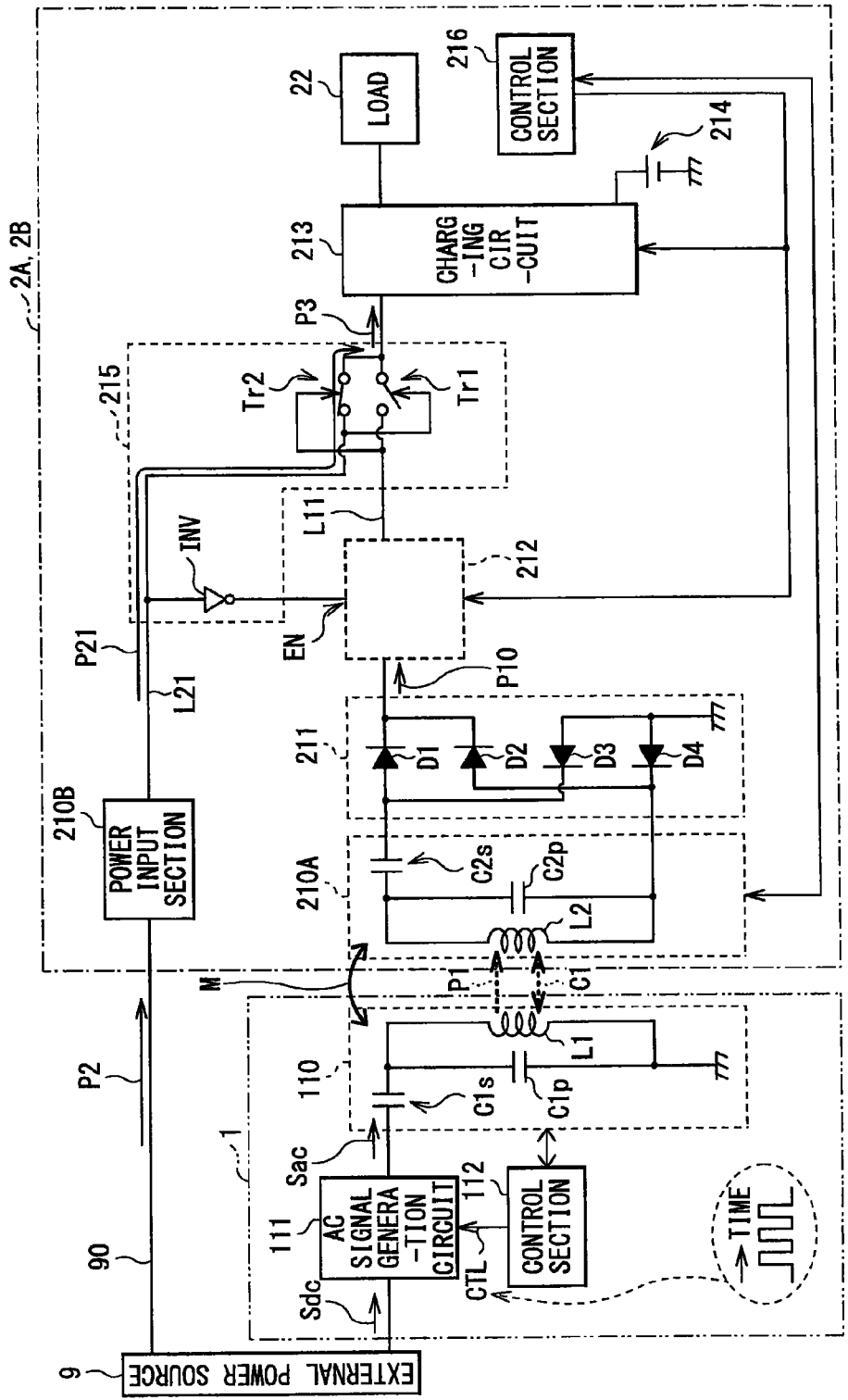
FIG. 8 is a circuit diagram illustrating still another example of the input switching operation in the feed system illustrated in FIG. 3.

On the other hand, for example, as illustrated in FIG. 8, when both the power P1 using the magnetic field and the power P2 by the wired connection are supplied from the feed unit 1 to the electronic apparatuses 2A and 2B, the input switching operation by the input switching circuit 215 is performed in the following manner.

Specifically, also in this case, as with the above-described case where only the power P2 is supplied, the power P21 is output from the power input section 210B. Therefore, the input signal to the inverter circuit INV is the "H" signal, and the output signal therefrom is the "L" signal. Accordingly, the "L" signal is input to the enable terminal EN of the voltage stabilization circuit 212 also in this case, and the operation of the voltage stabilization circuit 212 becomes invalid. As a result, in this case, although the power P10 based on the power P1 is supplied to the voltage stabilization circuit 212, the power P11 is not generated and is not output to the input switching circuit 215.

Moreover, also in this case, since the signal on the connection line L21 from the power input section 210B is the "H" signal, the P-type transistor Tr1, the gate of which is supplied with the "H" signal is put into the OFF state. Likewise, since the signal on the connection line L11 to which the power P11 is not output, from the voltage stabilization circuit 212 is the "L" signal, the P-type transistor Tr2, the gate of which is supplied with the "L" signal is put into the ON state.

In this way, when both the power P1 using the magnetic field and the power P2 by the wired connection are supplied, the transistor Tr1 is put into the OFF state and the transistor Tr2 is put into the ON state in the input switching circuit 215. Therefore, the power P21 based on the power P2 is selectively output as the power P3. As a result, also in this case, the charging operation to the battery 214 is performed based on the power P2 by the wired connection.

More specifically, in the present embodiment in particular, when both the power P1 and P2 are supplied to the electronic apparatuses 2A and 2B, the power P2 by the wired connection is preferentially selected and output from the input switching circuit 215. The reason why the power P by the wired connection out of the power P1 using the magnetic field and the power P2 by the wired connection is preferentially input and is used in the charging operation is because the power efficiency, the power amount, and the like in charging in the case of using the power P2 tend to be superior to those in the case of using the power P1.

Moreover, in the present embodiment, as with the case of FIG. 7 and FIG. 8 described above, the above-described communication operation (the communication period Tc) between the feed unit 1 and the electronic apparatuses 2A and 2B may be desirably set in the following manner. Specifically, such communication operation may be desirably performed not only in the case where at least the power P1 using the magnetic field is supplied but also in the case where only the power P2 by the wired connection is supplied. This is because, even in the case where the charging operation based on the power P1 using the magnetic field is not performed, for example, if the communication operation is not continued when the power supply cord 90 is pulled thereafter and the charging operation based on the power P2 by the wired connection is stopped, or the like, the stoppage of the charging operation is not allowed to be detected. If the stoppage of the charging operation is not allowed to be detected as described above, the charging operation is not allowed to be recovered (restarted), which causes impairment in usability of a user.

As described above, in the present embodiment, one of the power P1 by the power transmission using the magnetic field from the feed unit 1 and the power P2 by the wired connection from the external power source 9 is output from the input switching circuit 215, and the charging to the battery 214 is performed based on the output power P3. Therefore, it is possible to achieve the charging operation with high degree of freedom, selectively using one of the power P1 and P2. Consequently, it is possible to improve usability of a user in performing the charging operation.

<Modifications>

Subsequently, modifications (modifications 1 and 2) of the above-described embodiment will be described. Note that like numerals are used to designate substantially like components of the embodiment, and the description thereof will be appropriately omitted.

(Modification 1)

Figure 9:
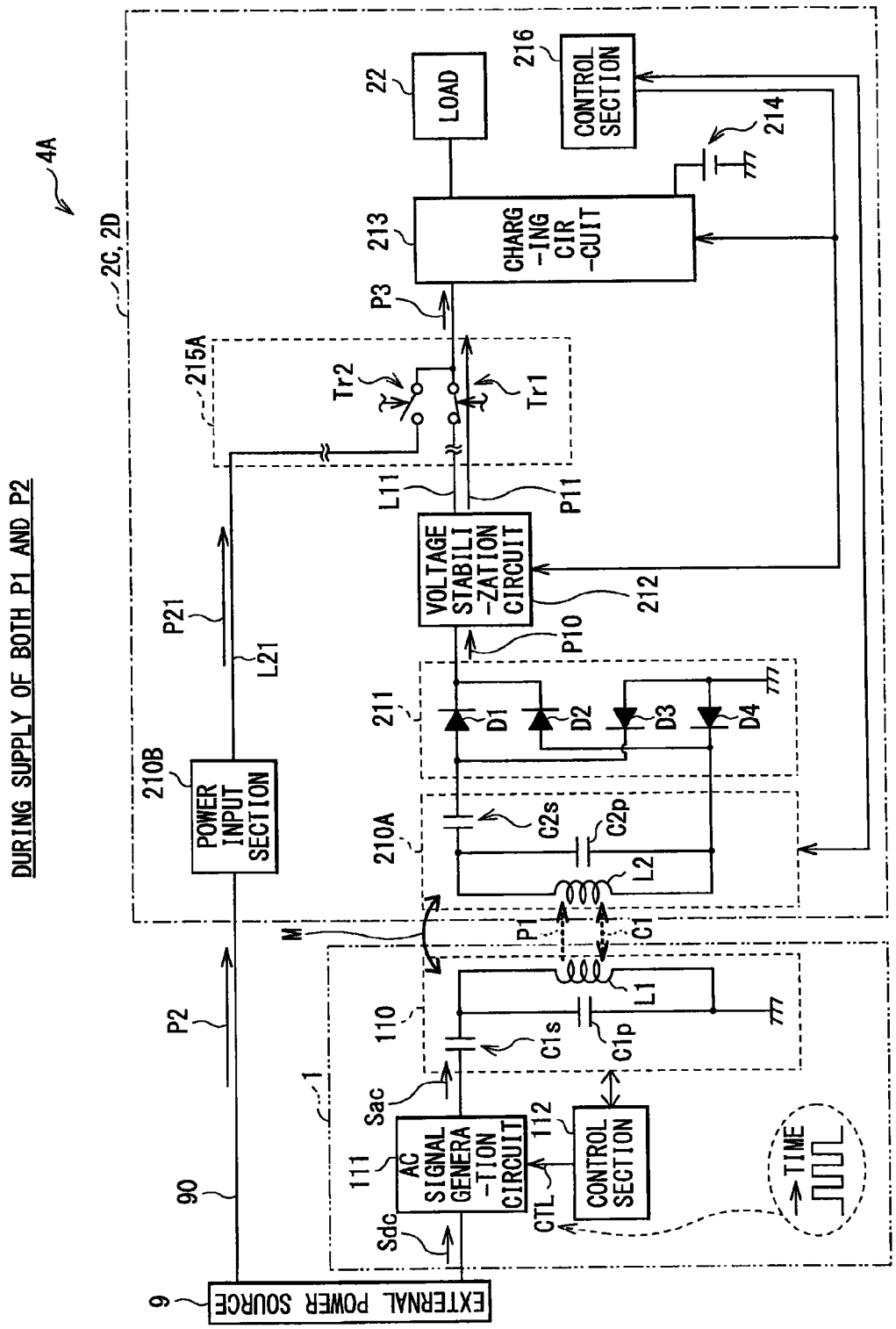
FIG. 9 is a circuit diagram illustrating an example of a configuration of a feed system and input switching operation according to a modification 1.

FIG. 9 illustrates an example of a configuration of a feed system (a feed system 4A) and input switching operation according to a modification 1. The feed system 4A is provided with electronic apparatuses 2C and 2D in place of the electronic apparatuses 2A and 2B in the feed system 4 of the above-described embodiment, and other configurations are similar to those in the feed system 4.

The electronic apparatuses 2C and 2D are each provided with an input switching circuit 215A described below in place of the input switching circuit 215 in the electronic apparatuses 2A and 2B, and other configurations are similar to those in each of the electronic apparatuses 2A and 2B.

For example, as illustrated in FIG. 9, the input switching circuit 215A is configured to include the two transistors Tr1 and Tr2 as the switching devices. Further, similarly to the input switching circuit 215, the input switching circuit 215A outputs one of the power P1 by the power transmission using the magnetic field and the power P2 supplied through the wired connection. In addition, when both the power P1 and P2 are supplied to the electronic apparatuses 2A and 2B, the input switching circuit 215A selects and outputs one of the power P1 and P2.

However, unlike the input switching circuit 215, for example, as illustrated in FIG. 9, when both the power P1 and P2 are supplied to the electronic apparatuses 2A and 2B, the input switching circuit 215A preferentially selects the power P1 by the power transmission using the magnetic field, and outputs the power P1 as the power P3. More specifically, in the present modification, in this case, the transistor Tr1 is put into the ON state, and the transistor Tr2 is put into the OFF state.

As described above, depending on the case, not the power P2 by the wired connection but the power P1 by the power transmission using the magnetic field may be preferentially selected and output.

(Modification 2)

Figure 10:
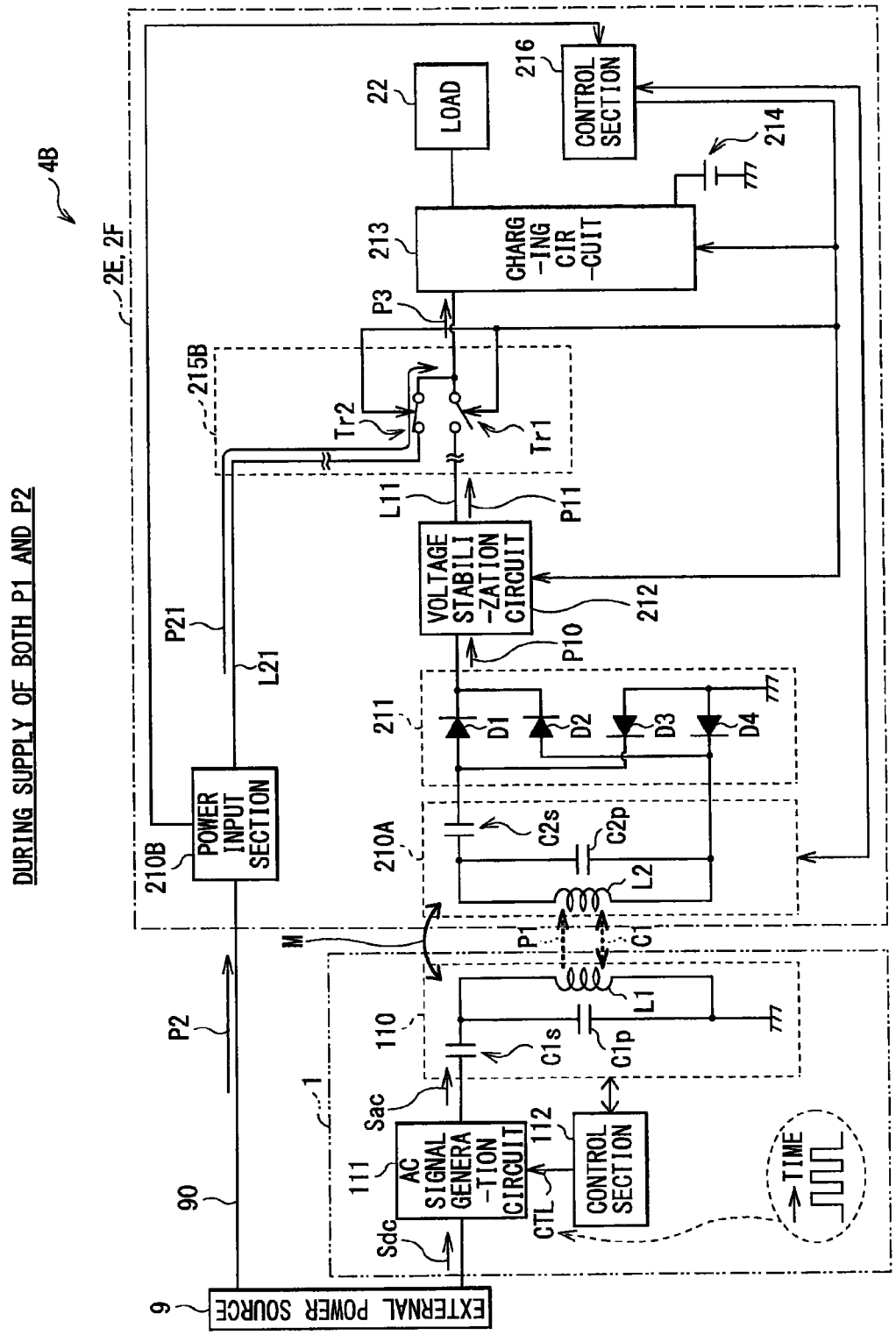
FIG. 10 is a circuit diagram illustrating an example of a configuration of a feed system and input switching operation according to a modification 2.
Figure 11:
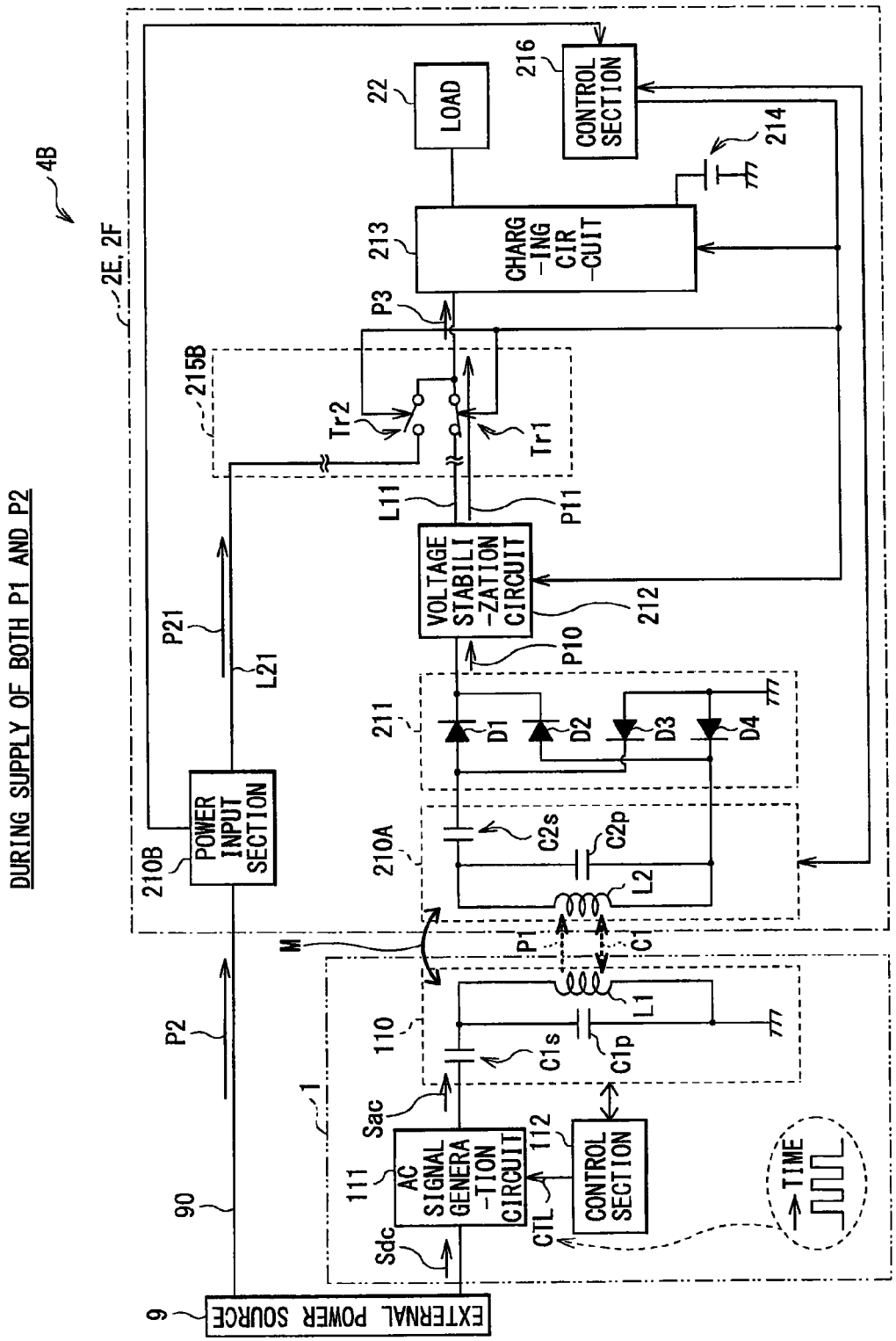
FIG. 11 is a circuit diagram illustrating another example of the configuration of the feed system and the input switching operation according to the modification 2.

FIG. 10 and FIG. 11 each illustrate an example of a configuration of a feed system (a feed system 4B) and input switching operation according to a modification 2. The feed system 4B is provided with electronic apparatuses 2E and 2F in place of the electronic apparatuses 2A and 2B in the feed system 4 according to the above-described embodiment, and other configurations are similar to those in the feed system 4.

The electronic apparatuses 2E and 2F are each provided with an input switching circuit 215B described below in place of the input switching circuit 215 in the electronic apparatuses 2A and 2B, and dynamically control the operation of the input switching circuit 215B (the input switching operation) by the control section 216.

As illustrated in FIG. 10 and FIG. 11, the input switching circuit 215B is configured to include the two transistors Tr1 and Tr2 as the switching devices. However, unlike the above-described input switching circuits 215 and 215A, in the input switching circuit 215B, the input switching operation is not achieved by own circuit, and the ON-OFF operation (the input switching operation) of the transistors Tr1 and Tr2 is controlled by the control section 216.

Specifically, as described above, the control section 216 (a switching control section) of the present modification has a function of dynamically controlling the input switching operation by the input switching circuit 215B. More specifically, when both the power P1 and P2 are supplied to the input switching circuit 215B, the control section 216 controls the input switching operation based on predetermined parameters so that one of the power P1 and P2 is selected and output.

Incidentally, information indicating whether the power P1 and P2 are supplied to each of the power reception section 210A and the power input section 210B may be supplied from the power reception section 210A and the power input section 210B to the control section 216 at any time. In addition, examples of the above-described predetermined parameters may include, for example, parameters such as power efficiency and a power amount in charging described above. However, the control of the input switching operation may be performed by the control section 216 based on, for example, information obtained through manual operation (such as pressing of a switch) by a user.

In this example, as the control of the input switching operation, for example, as illustrated in FIG. 10, the case where the control section 216 sets the transistor Tr1 in the input switching circuit 215B to the OFF state and sets the transistor Tr2 to the ON state may be exemplified. Accordingly, when both the power P1 using the magnetic field and the power P2 by the wired connection are supplied, the power P21 based on the power P2 is preferentially selected and output as the power P3. Therefore, in this case, the charging operation to the battery 214 is performed based on the power P2 by the wired connection.

Alternatively, for example, as illustrated in FIG. 11, the case where the control section 216 sets the transistor Tr1 in the input switching circuit 215 to the ON state and sets the transistor Tr2 to the OFF state may be exemplified. Accordingly, when both the power P1 using the magnetic field and the power P2 by the wired connection are supplied, the power P11 based on the power P1 is preferentially selected and output as the power P3. Therefore, in this case, the charging operation to the battery 214 is performed based on the power P1 by the power transmission using the magnetic field.

<Other Modifications>

Hereinbefore, although the technology of the present disclosure has been described with referring to the embodiment and the modifications, the technology is not limited to the embodiment and the like, and various modifications may be made.

For example, in the above-described embodiment and the like, various kinds of coils (the power transmission coil and the power reception coil) have been described. However, various kinds of configurations are allowed to be used as the configurations (shapes) of the respective coils. Specifically, for example, each coil may be configured in shapes such as a spiral shape, a loop shape, a bar shape using a magnetic body, an alpha-wound shape configured by folding a spiral coil into two layers, a multilayer spiral shape, and a helical shape configured by winding a wire in a thickness direction thereof. Moreover, each coil is not limited to a winding coil configured of a conductive wire rod, and may be a conductive patterned coil configured of a printed board, a flexible printed board, or the like.

In addition, in the above-described embodiment and the like, although the electronic apparatus has been described as an example of a unit to be fed with power, the unit to be fed with power is not limited thereto, and may be other than the electronic apparatus (for example, vehicles such as electric cars).

Furthermore, in the above-described embodiment and the like, the components of each of the feed unit and the electronic apparatuses have been specifically described. However, all of the components are not necessarily provided, and other components may be further provided. For example, in the feed unit or in the electronic apparatus, a communication function, a control function, a display function, a function of authenticating a secondary-side unit, a function of detecting mixture of a dissimilar metal and the like, etc. may be provided. In addition, the configuration (the circuit configuration) of the input switching circuit (a switching section) is not limited to those described in the above-described embodiment and the like, and may be other configuration. For example, although a circuit to prevent backflow of a current (a backflow preventing circuit) is not provided in the input switching circuit described in each of the above-described embodiment and the like, such a backflow preventing circuit may be desirably provided in actual.

Moreover, in the above-described embodiment and the like, mainly, the case where the feed system includes a plurality of (two) electronic apparatuses has been described as an example. However, the number of electronic apparatuses is not limited thereto, and the feed system may include only one electronic apparatus.

Furthermore, in the above-described embodiments and the like, the charging tray for a small electronic apparatus (CE device) such as a mobile phone has been described as an example of the feed unit. However, the feed unit is not limited to such a household charging tray, and is applicable as a charging unit for various electronic apparatuses, and the like. In addition, the feed unit is not necessarily a tray, and for example, may be a stand for electronic apparatuses such as a so-called cradle.

(Example of Feed System Performing Non-Contact Power Transmission Using Electric Field)

Moreover, in the above-described embodiment and the like, the case of the feed system that performs non-contact power transmission (feeding) using a magnetic field from a feed unit as a primary-side unit to an electronic apparatus as a secondary-side unit has been described as an example; however this is not limitative. In other words, the contents of the present disclosure is applicable to a feed system that performs non-contact power transmission using an electric field (electric field coupling) from a feed unit as a primary-side unit to an electronic apparatus as a secondary-side unit, and effects similar to those in the above-described embodiment and the like may be obtained.

Figure 12:
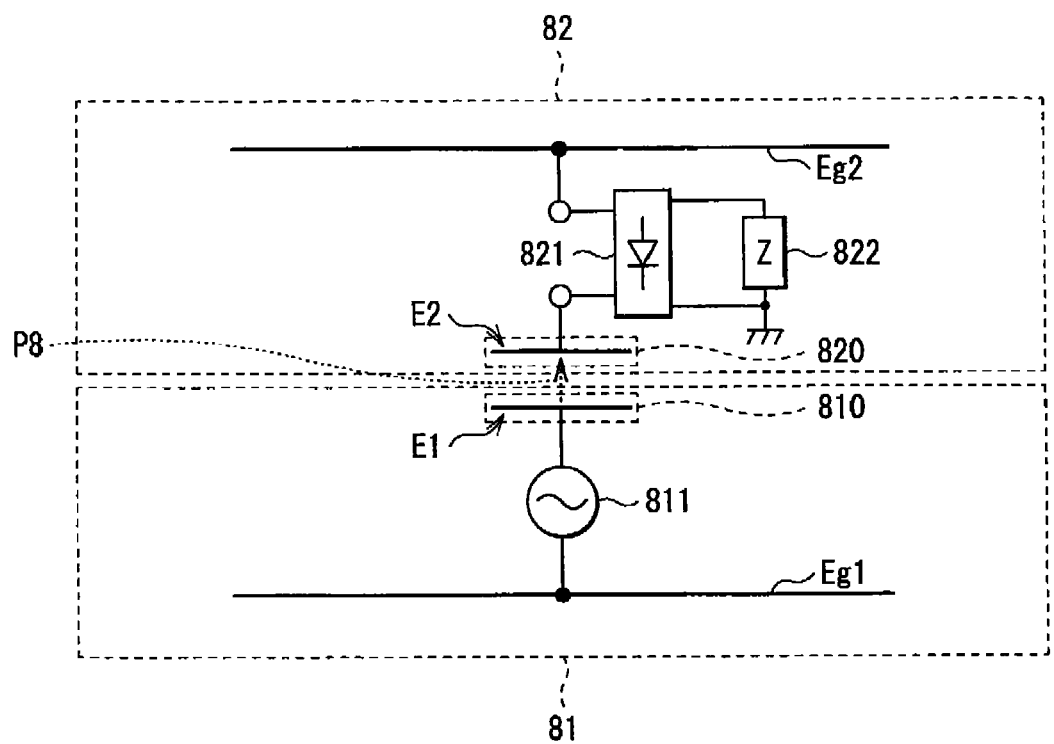
FIG. 12 is a block diagram illustrating a schematic configuration example of a feed system according to another modification.

Specifically, for example, a feed system illustrated in FIG. 12 may include one feed unit 81 (a primary-side unit) and one electronic apparatus 82 (a secondary-side unit). The feed unit 81 mainly has a power transmission section 810 including a power transmission electrode E1 (a primary-side electrode), an AC signal source 811 (an oscillator), and a ground electrode Eg1. The electronic apparatus 82 mainly has a power reception section 820 including a power reception electrode E2 (a secondary-side electrode), a rectification circuit 821, a load 822, and a ground electrode Eg2. More specifically, the feed system includes two pairs of electrodes, the power transmission electrode E1 and the power reception electrode E2, and the ground electrodes Eg1 and Eg2. In other words, each of the feed unit 81 (the primary-side unit) and the electronic apparatus 82 (the secondary-side unit) has an antenna configured of a pair of asymmetric electrode structures, such as a monopole antenna therein.

Figure 13:
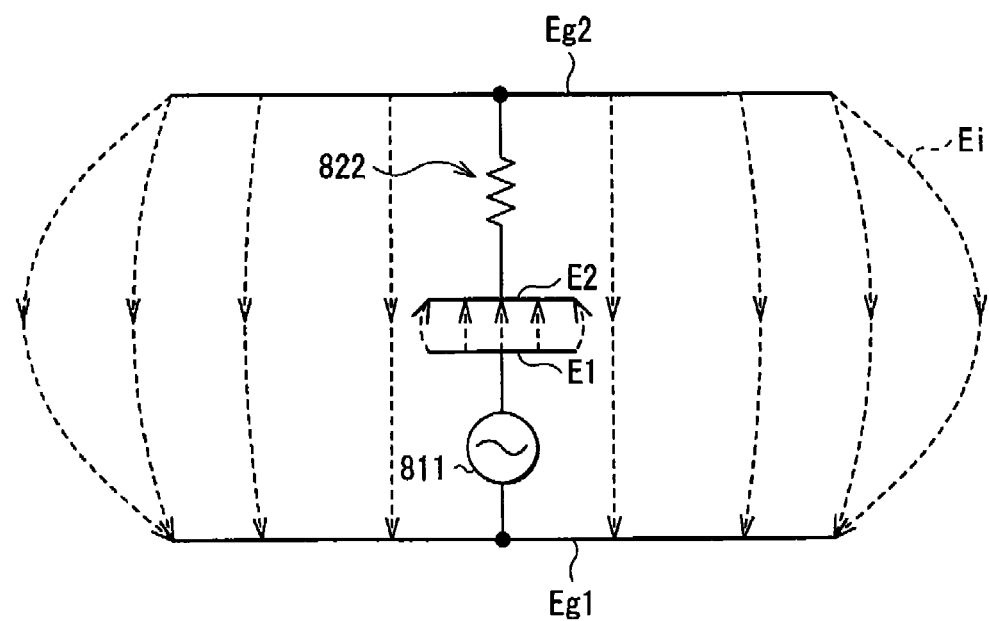
FIG. 13 is a schematic diagram illustrating an example of a propagation mode of an electric field in the feed system illustrated in FIG. 12.

In the feed system having such a configuration, when the power transmission electrode E1 and the power reception electrode E2 face each other, the above-described non-contact antennae are coupled with each other (are coupled with each other by an electric field along a perpendicular direction of the electrodes). Then, the induction field is generated therebetween, and power transmission using the electronic field is accordingly performed (see power P8 illustrated in FIG. 12). More specifically, for example, as schematically illustrated in FIG. 13, the generated electric field (induction field Ei) propagates from the power transmission electrode E1 side to the power reception electrode E2 side, as well as the generated induction field Ei propagates from the ground electrode Eg2 side to the ground electrode Eg1 side. In other words, a loop path of the generated induction field Ei is formed between the primary-side unit and the secondary-side unit. Also in such a non-contact power supply system using the electronic field, similar effects are allowed to be obtained by applying similar method to that in the above-described embodiment and the like.

Note that the present technology may be configured as follows.

(1) An electronic apparatus including:
a power reception section configured to receive first power from a feed unit through power transmission with use of a magnetic field or an electric field;
a power input section configured to receive second power supplied from an external power source through wired connection;
a switching section configured to output one of the first power supplied from the power reception section and the second power supplied from the power input section; and
a secondary battery configured to be charged, based on power output from the switching section.

(2) The electronic apparatus according to (1), wherein the switching section outputs the first power when only the first power is supplied, outputs the second power when only the second power is supplied, and selects and outputs one of the first power and the second power when both the first and second power are supplied.

(3) The electronic apparatus according to (2), wherein the switching section preferentially selects and outputs the second power when both the first and second power are supplied.

(4) The electronic apparatus according to (3), further including:
a charging section configured to perform charging on the secondary battery, based on the power output from the switching section; and a power supply circuit provided between the power reception section and the switching section.

(5) The electronic apparatus according to (4), wherein the switching section renders operation of the power supply circuit invalid when at least the second power is supplied.

(6) The electronic apparatus according to (2), wherein the switching section preferentially selects and outputs the first power when both the first and second power are supplied.

(7) The electronic apparatus according to any one of (1) to (6), further including a switching control section configured to dynamically control operation of the switching section.

(8) The electronic apparatus according to (7), wherein the switching control section controls the operation of the switching section to allow one of the first and second power to be selected and output based on a predetermined parameter when both the first and second power are supplied to the switching section.

(9) The electronic apparatus according to any one of (1) to (8), wherein communication operation with the feed unit is performed when only the second power is supplied, in addition to when the first power is supplied.

(10) A feed system provided with one or a plurality of electronic apparatuses and a feed unit configured to perform power transmission to the one or the plurality of electronic apparatuses with use of a magnetic field or an electric field, the one or the plurality of electronic apparatuses each including:
a power reception section configured to receive first power through the power transmission;
a power input section configured to receive second power supplied from an external power source through wired connection;
a switching section configured to output one of the first power supplied from the power reception section and the second power supplied from the power input section; and
a secondary battery configured to be charged, based on power output from the switching section.

This application is based upon and claims the benefit of priority of the Japanese Patent Application No. 2011-281212, filed on Dec. 22, 2011, and the Japanese Patent Application No. 2012-93838, filed on Apr. 17, 2012, both filed with the Japan Patent Office, the entire contents of these applications are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An electronic apparatus comprising:
a power reception circuit configured to receive first power from a feed device through power transmission with use of a magnetic field or an electric field;
a power input circuit configured to receive second power supplied from an external power source through wired connection;
a switching circuit configured to output one of the first power supplied from the power reception circuit and the second power supplied from the power input circuit;
a battery; and
a voltage stabilization circuit connected to the power reception circuit, the power input circuit and the switching circuit, wherein
the battery is configured to be charged, based on power output from the switching circuit, and when the second power is supplied, the voltage stabilization circuit is configured to suppress outputting a power even when the voltage stabilization circuit receives an input power.

2. The electronic apparatus according to claim 1, wherein the switching circuit outputs the first power when only the first power is supplied, outputs the second power when only the second power is supplied, and selects and outputs one of the first power and the second power when both the first and second power are supplied.

3. The electronic apparatus according to claim 2, wherein the switching circuit preferentially selects and outputs the second power when both the first and second powers are supplied.

4. The electronic apparatus according to claim 3, further comprising:
a charging circuit configured to perform charging on the battery, based on the power output from the switching circuit.

5. The electronic apparatus according to claim 2, wherein the switching circuit preferentially selects and outputs the first power when both the first and second powers are supplied.

6. The electronic apparatus according to claim 1, further comprising a switching control circuit configured to dynamically control operation of the switching circuit.

7. The electronic apparatus according to claim 6, wherein the switching control circuit controls the operation of the switching circuit to allow one of the first and second power to be selected and output based on predetermined parameters when both the first and second power are supplied to the switching circuit.

8. The electronic apparatus according to claim 1, wherein communication operation with the feed device is performed when only the second power is supplied, in addition to when the first power is supplied.

9. The electronic apparatus according to claim 1, wherein the power transmission is divided into a charging period and a non-charging communication period.

10. A feed system comprising:
circuitry configured to perform power transmission to an electronic apparatus with use of a magnetic field or an electric field, and
the electronic apparatus including:
a power reception circuit configured to receive first power from a feed device through the power transmission;
a power input circuit configured to receive second power supplied from an external power source through wired connection;
a switching circuit configured to output one of the first power supplied from the power reception circuit and the second power supplied from the power input circuit;
a battery; and
a voltage stabilization circuit connected to the power reception circuit, the power input circuit and the switching circuit, wherein
the battery is configured to be charged, based on power output from the switching circuit, and
when the second power is supplied, the voltage stabilization circuit is configured to suppress outputting a power even when the voltage stabilization circuit receives an input power.

11. The feed system according to claim 10, wherein the switching circuit outputs the first power when only the first power is supplied, outputs the second power when only the second power is supplied, and selects and outputs one of the first power and the second power when both the first and second power are supplied.

12. The feed system according to claim 11, wherein the switching circuit preferentially selects and outputs the second power when both the first and second powers are supplied.

13. The feed system according to claim 12, further comprising:
a charging circuit configured to perform charging on the battery, based on the power output from the switching circuit.

14. The feed system according to claim 11, wherein the switching circuit preferentially selects and outputs the first power when both the first and second powers are supplied.

15. The feed system according to claim 10, further comprising a switching control circuit configured to dynamically control operation of the switching circuit.

16. The feed system according to claim 15, wherein
the switching control circuit configured to control the operation of the switching circuit to allow one of the first and second power to be selected and output based on predetermined parameters when both the first and second power are supplied to the switching circuit.

17. The feed system according to claim 10, wherein communication operation with the feed device is performed when only the second power is supplied, in addition to when the first power is supplied.

18. The feed system according to claim 10, wherein the power transmission is divided into a charging period and a non-charging communication period.

* * * * *